(12) United States Patent
Bertram et al.

(10) Patent No.: US 11,655,642 B2
(45) Date of Patent: May 23, 2023

(54) LARGE MANIPULATOR WITH AUTOMATED MAST SET-UP

(71) Applicant: Schwing GmbH, Herne (DE)

(72) Inventors: Torsten Bertram, Düsseldorf (DE); Christoph Rösmann, Essen (DE); Frank Hoffmann, Dortmund (DE); Freia Irina Muster, Schwerte (DE); Johannes Henikl, Dorsten (DE); Maximilian Krämer, Lünen (DE)

(73) Assignee: SCHWING GMBH, Heerstrasse (DE)

( * ) Notice: Subject to any disclaimer, the term of this patent is extended or adjusted under 35 U.S.C. 154(b) by 988 days.

(21) Appl. No.: 16/472,612

(22) PCT Filed: Dec. 21, 2017

(86) PCT No.: PCT/EP2017/084028
§ 371 (c)(1),
(2) Date: Jun. 21, 2019

(87) PCT Pub. No.: WO2018/115248
PCT Pub. Date: Jun. 28, 2018

(65) Prior Publication Data
US 2020/0392746 A1    Dec. 17, 2020

(30) Foreign Application Priority Data
Dec. 21, 2016    (DE) .................. 10 2016 125 145.3

(51) Int. Cl.
| | | |
|---|---|---|
| *E04G 21/04* | (2006.01) | |
| *B25J 9/16* | (2006.01) | |
| *B66C 13/40* | (2006.01) | |

(52) U.S. Cl.
CPC ........ *E04G 21/0436* (2013.01); *B25J 9/1689* (2013.01); *E04G 21/0463* (2013.01); *B66C 13/40* (2013.01)

(58) Field of Classification Search
CPC .............. E04G 21/0436; E04G 21/0463; B25J 9/1689; B66C 13/40
See application file for complete search history.

(56) References Cited

U.S. PATENT DOCUMENTS 5,833,762 A * 11/1998 Wanner .................... B08B 1/04
134/123

FOREIGN PATENT DOCUMENTS

| DE | 19520166 A1 | 11/1995 | |
|---|---|---|---|
| DE | 19520166 C2 * | 3/2000 | ........... B66C 13/066 |

(Continued)

OTHER PUBLICATIONS

Hovemeyer, DE 102008017961 A1, Oct. 15, 2009, English translation. (Year: 2009).*

(Continued)

*Primary Examiner* — Mary Cheung
(74) *Attorney, Agent, or Firm* — Faegre Drinker Biddle & Reath LLP (57) ABSTRACT

A large manipulator includes a chassis, a mast pedestal, an articulated mast, and a control unit. The mast pedestal is rotatable around a vertical axis by means of a rotary drive and arranged on the chassis. The articulated mast includes two or more mast arms pivotally-movably connected, via articulated joints, with the respectively adjacent mast pedestal or other mast arm by a pivot drive. The control unit is configured to actuate the pivot drive and/or the rotary drive to move the articulated mast with a control sequence from an initial position of the articulated mast, autonomously, into a pre-specified target position of the articulated mast.

14 Claims, 3 Drawing Sheets

(56) References Cited

FOREIGN PATENT DOCUMENTS

| DE | 19946411 A1 | 4/2001 | |
|---|---|---|---|
| DE | 102008017961 A1 * | 10/2009 | ............. E04G 21/04 |
| DE | 102008017961 A1 | 10/2009 | |
| DE | 102013014626 A1 | 3/2015 | |
| DE | 102014009165 A1 | 12/2015 | |
| DE | 102015208577 A1 * | 11/2016 | ......... E04G 21/0436 |
| WO | WO-0244499 A1 * | 6/2002 | ......... E04G 21/0436 |
| WO | 2014166637 A1 | 10/2014 | |
| WO | 2015109976 A1 | 7/2015 | |

OTHER PUBLICATIONS

International Preliminary Report on Patentability issued in PCT/EP2017/084028 [with English translation], dated Jul. 4, 2019, 14 pages.

International Search Report and Written Opinion issued in PCT/EP2017/084028 [with English translation], dated Apr. 13, 2018, 17 pages.

\* cited by examiner

LARGE MANIPULATOR WITH AUTOMATED MAST SET-UP

CROSS-REFERENCE TO RELATED APPLICATION

This application is a U.S. 371 Application of International Application No. PCT/EP2017/084028, Dec. 21, 2017, which claims priority to German Patent Application No. 10 2016 125 145.3, filed Dec. 21, 2016, both of which are herein incorporated by reference in their entireties for all purposes.

The invention relates to a large manipulator, in particular a truck-mounted concrete pump, with a mast pedestal, rotatable around a vertical axis by means of a rotary drive, which pedestal is arranged on a chassis, an articulated mast, which includes two or more mast arms, wherein the mast arms are pivotally-movably connected, via articulated joints, with the respectively adjacent mast pedestal or mast arm by means of in each case one pivot drive, and with a control unit actuating the drives, for the mast movement.

Furthermore, the invention relates to a method for controlling the movement of an articulated mast of a large manipulator, in particular a truck-mounted concrete pump.

Large manipulators are known in a plurality of configurations from the prior art. WO 2014/166637 A1, for example, discloses a large manipulator with articulated mast. WO 2014/166637 A1 suggests a large manipulator, in which the control unit provides a rapid traverse for the rotary drive of the mast pedestal, in order to rotate the articulated mast, with increased speed, into the desired working position, wherein the rapid traverse is selectable only if the mast or boom is completely folded together. A single sensor, which interacts with the control unit, is provided in the previously known large manipulator, wherein it is determinable, via the sensor, if the articulated mast is completely folded together or not. The sensor generates a release signal to the control unit, as long as it is ensured that the articulated mast is folded together and thusly has a minimum radius. In this state, the articulated mast can be rotated with increased speed. The legal standards for the mast tip speed are thusly better exploited, relative to a conventional mast control, in which the maximum speeds of the individual hydraulic drives of the joints are set out according to a worst-case scenario. This worst-case scenario takes into consideration the mast position with respectively maximum possible distance between the respective joint and the mast tip.

As was already recognized in the aforementioned document, the duration for the start-up of a large manipulator on a construction site today is substantially determined through the time for the set-up of the mast, that is the unfolding of the articulated mast. Reasons for the long set-up time of the mast are, for one, in the above-mentioned conventional design of the maximum speeds of the individual drives with regards to the standards for the maximum speed of the mast tip, which standards ensure operational safety and are meant to prevent an endangering of persons on the construction site. For another, the simultaneous control of multiple joints at high speeds requires great skill by the operator. Typically, the manually controlled movement sequences therefore rather occur sequentially, with corresponding safety distances to possible collision objects. This is not efficient, however, with respect to the set-up time.

A further limiting factor for the set-up time is the maximum conveying performance of the hydraulic pumps, which provide the hydraulic circuit of the mast hydraulics with oil. In the ongoing operation, upon simultaneous activation of multiple joints with large drive cylinders, an undersupply can occur, so that the individual drives cannot be moved with the pre-specified speed.

Against this background, it is the object of the invention to provide an improved large manipulator. In particular, the articulated mast shall be able to be brought from the, if possible, completely folded state into its desired working position as quickly as possible. Further, the articulated mast shall be able to be transferred from the working position into the completely folded position as quickly as possible. In addition, the articulated mast, in the set-up state, shall be displaceable from an initial position to a different target position in short time.

The invention, starting from a large manipulator of the type mentioned above, achieves the object in that the control unit is configured to autonomously transfer the articulated mast, in a control sequence for the actuation of the drives, from an initial position of the articulated mast into a pre-specified target position of the articulated mast.

To reduce in particular the set-up time of the articulated mast, it is suggested to support the operator through a control unit, which transfers the articulated mast from an initial position of the articulated mast, such as the folded state, autonomously, into a pre-specified target position of the articulated mast, at which said mast reaches e.g, the desired concreting site. To that end, the control unit autonomously carries out a control sequence, according to which the drives are actuated. In other words, the control sequence is a sequence of control signals, with which the drives of the large manipulator are actuated. The control sequence for the actuation of the drives can, through the autonomous actuation by means of the control unit, be more complex than in a manual operation, and can provide for the simultaneous activation of multiple or even all drives of the articulated mast. The operator must merely specify to the control unit the target position of the articulated mast. For safety reasons, the autonomous actuation of the drives shall be permanently enabled, through the control unit, by the operator of the large manipulator, during the control sequence, in order to e,g, avoid collisions with unexpectedly occurring obstacles. The limits of the system can here be exploited as well as possible. To that end, speeds of the individual drives of the articulated mast, higher relative to a conventional mast control, are permitted while maintaining the maximum speed of the masttip stipulated by norms, among other things.

Advantageous configurations and further developments of the invention result from the dependent claims.

According to an advantageous configuration of the invention, it is provided that the articulated mast comprises a mast tip, wherein the target position of the articulated mast is defined through the pre-specified position of the mast tip. Pre-specifying of the target position for the mast tip makes the articulated mast deployable after autonomous transferring of the articulated mast from the initial position into the pre-specified target position. The control unit autonomously actuates the pre-specified target position for the actuation of the drives, so that the mast tip automatically reaches the target position.

An advantageous embodiment is that the specification of the target position of the articulated mast occurs, through the operator, upon selection, in a graphical representation, wherein the graphical representation offers a selection of multiple possible target positions of the articulated mast. Based on the graphical representation, the operator can very simply and very vividly specify the target position. Preferably, the graphical representation shows the working area of the large manipulator from a bird's eye view, so that possible target positions are intuitively selectable.

A preferred embodiment provides that the control unit determines the control sequence for the actuation of the drives in such a way that the total time for the transferring of the articulated mast from the initial position into the pre-specified target position is minimal. The selection of the control sequence for the actuating of the drives based on the minimum total time ensures a temporal optimization of the autonomous actuation of the articulated mast by means of the control unit.

In a further preferred variant, it is provided to establish the control sequence for the actuation of the drives such that the total time for the transferring of the articulated mast from an initial position into a pre-specified target position does not exceed a pre-defined maximum time. With respect to the above-mentioned minimization of the total time for the approaching of the target position, the advantage here results that the establishing of the control sequence, under some circumstances, is more simply and quickly possible.

Particularly advantageous is the further development that a mast sensor system is provided for detecting the position of at least one point of the articulated mast or a pivot angle of at least one articulated joint, wherein the control unit is configured to identify the position of the articulated mast based on the starting signal of the mast sensor system. Such a manner of mast sensor system can, for one, be used in order to monitor the movement of the articulated mast during the actuation in the context of the control sequence. Moreover, whether the articulated mast has reached the pre-specified target position, in order to then end the control sequence, can be reviewed using the mast sensor system.

Further advantageous is the configuration that the control unit is configured to identify the initial position of the articulated mast based on the output signal of the mast sensor system. Through the sensorial detection of the current mast position as initial position, the articulated mast can be autonomously transferred from any mast position, through an established control sequence, into a pre-specified target position.

An advantageous embodiment of the invention provides that the control unit is configured to establish the control sequence for the actuation of the drives for the autonomous transferring of the articulated mast into a pre-specified target position of the articulated mast, based on the output signal of the mast sensor system. This configuration has the advantage that the control unit independently selects or computes a control sequence for the actuation of the drives, depending upon the current initial position. Certain control sequences can be stored in advance in the control unit, which sequences transfer the articulated mast from a number of pre-specified possible initial positions into a number of pre-specified possible target positions. The control unit then only selects the suitable control sequence. Alternatively, the control unit carries out a computation of the control sequence, for example while optimizing the time required for the transfer from the initial position into the target position. The control sequence can here be established e.g. based on an iterative method. Flexibility is thereby increased, as there are less limitations with respect to the possible starting and target positions. In both cases, the operator is supported to the effect that they must merely monitor the transferring of the articulated mast from the initial position into the target position.

A preferred embodiment of the invention provides that the control unit comprises a storage, wherein the storage includes readable control sequences for the actuation of the drives. Such a data storage is configured to store numerous control sequences for the actuation of the drives, so that these sequences do not have to be computed or computed anew by the control unit.

An advantageous embodiment is that the control unit is configured to compute a control sequence for the actuation of the drives through numerical solving of a dynamic optimization problem with constraints. Known and proven algorithm s can be used for the numerical solving of the dynamic optimization problem, in order to reliably obtain the control sequence while respecting the constraints.

The further development is particularly advantageous if the pivot range of the individual articulated joints and/or the maximum achievable pivoting speeds of the individual articulated joints and/or the maximum speed of the mast tip and /or the maximum permitted kinetic energy of the articulated mast and or the conveyance amount of the hydraulic pump supplying the mast hydraulics and/or the freedom from collisions and/or the bracing configuration of the large manipulator are provided as constraints for the dynamic optimization problem. The partial or complete taking into account of these constraints for the numerical solution of the dynamic optimization problem delivers, reliably and appropriate to the situation, in each case the optimal control sequence for the actuation of the drives for transferring the articulated mast from the initial position into the target position.

Because of the high speeds of the mast movement made available through the invention, the control unit according to an advantageous configuration of the invention, establishes the kinetic energy of the articulated mast in the mast movement, while taking into account the mast position and the mast speed, and limits the mast speed, via the controlling of the drives, such that a maximum kinetic energy of the articulated mast is not exceeded in its movement. With this measure, the occurrence of a mechanical overloading of the articulated mast is prevented in an abrupt acceleration or delay of the mast movement.

The invention makes it possible to permit higher displacement speeds, at individual articulated joints of the mast, in comparison to a conventional mast control, since the maximum allowed speed of the mast tip is taken into account as a constraint for the solution of the dynamic optimization problem. The legally stipulated framework for the mast speed can thusly be better exploited relative to the prior art.

Further, a method for controlling the movement of an articulated mast of a large manipulator, in particular a truck-mounted concrete pump, with a mast pedestal rotatable around a vertical axis by means of a rotary drive, which pedestal is arranged on a chassis, an articulated mast, which includes two or more mast arms, wherein the mast arms are pivotally-movably connected, via articulated joints, with the respectively adjacent mast pedestal or mast arm, by means of in each case one pivot drive, with a control unit actuating the drives, for the mast movement, wherein the drives are actuated with a control sequence by the control unit, and the articulated mast, in this control sequence, is transferred autonomously from an initial position of the articulated mast into a pre-specified target position of the articulated mast, is the subject-matter of the invention.

Through such a method, the set-up process of the articulated mast, for example, permits itself to be significantly simplified. The user is here supported through the control unit, which transfers the articulated mast from an initial position of the articulated mast, such as the folded state, autonomously, into a pre-specified target position of the articulated mast, such as the concreting site. The control sequence for the autonomous actuation of the drives can be more complex and can provide for the simultaneous activation of multiple or even all drives of the articulated mast. In this method, the operator of the control unit must merely specify the target position of the articulated mast. Such a method utilizes the limits of the system very well in that, for example, higher speeds of the individual drives of the articulated mast are permitted while maintaining the normatively specified maximum speed of the mast tip.

Advantageous configurations and further developments, with respect to the methods, result from the dependent claims.

Further features, details, and advantages of the invention result on the basis of the subsequent description, as well as based on the illustrations. Exemplary embodiments of the invention are illustrated purely schematically in the following illustrations and are described in detail in the following. Subject-matters or elements corresponding to one another are provided with the same reference characters in all figures. Shown are in.

Figure 1:
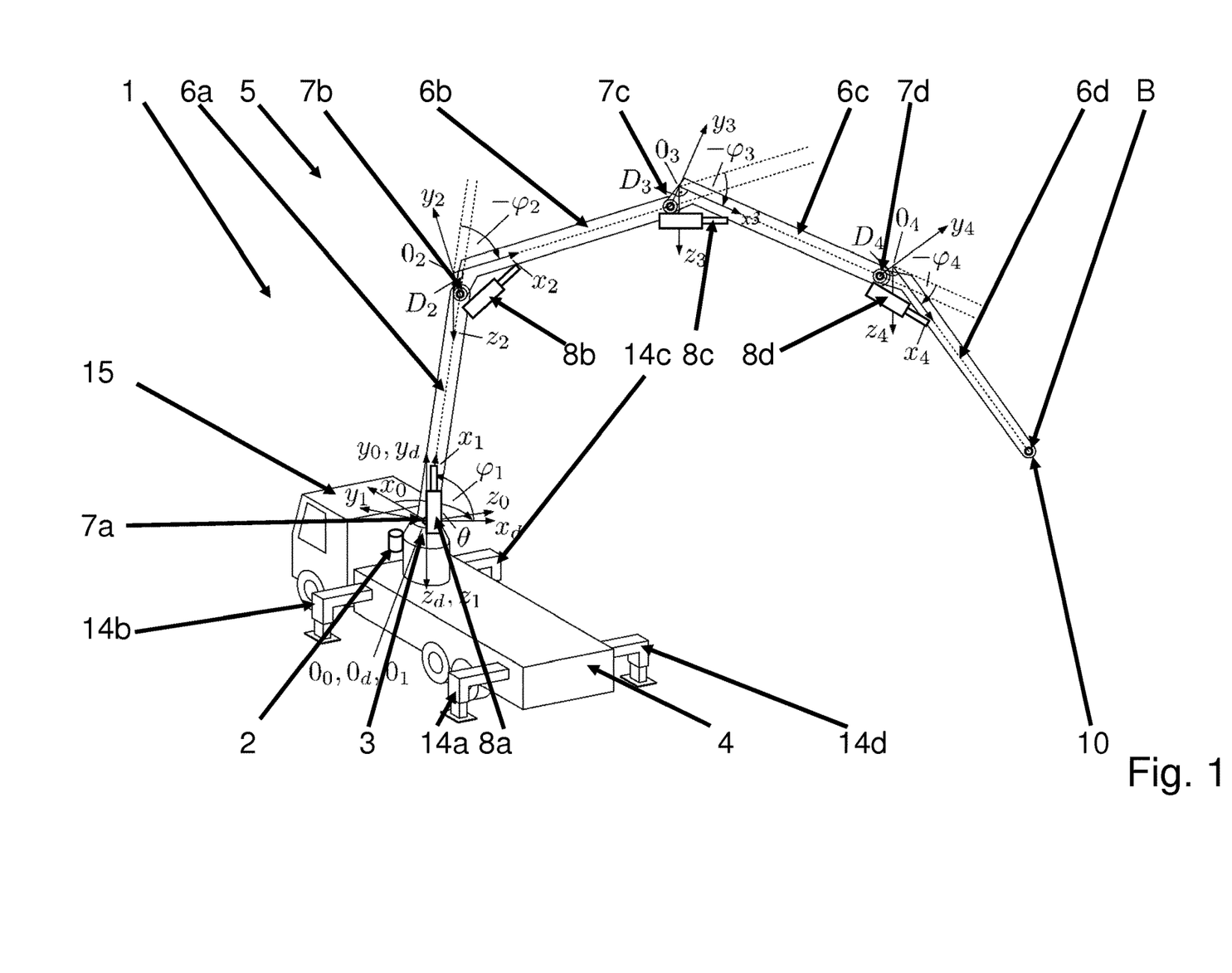
FIG. 1: a large manipulator according to the invention with articulated mast in unfolded position.

FIG. 1 schematically shows a large manipulator according to the invention, namely a truck-mounted concrete pump, with is referenced in totality by reference character 1. Within the scope of this disclosure, a working means, for example an arm, a boom, a lifting mechanism, a lifting frame or a mast are understood under the term large manipulator 1. The large manipulator 1 comprises an unfoldable articulated mast 5, which is arranged on a mast pedestal 3 rotatable around a vertical axis ye. This rotation of the mast pedestal 3 around the vertical axis is induced via a rotary drive 2, which consists of a transmission and a hydraulic motor, preferably to be actuated via a proportional control valve. The articulated masts is articulated on the mast pedestal 3, and comprises a plurality of, in the exemplary embodiment in total four, mast arms 6a, 6b, 6c, 6d, which are pivotable on articulated joints 7a, 7b, 7c, 7d, respectively around articulated axes relative to an adjacent mast arm 6a, 6b, 6c, 6d, or the mast pedestal 3, by means of in each case one pivot drive 8a, 8b, 8c, 8d. The first mast arm 6a is pivotally movably attached to the mast pedestal 3, via a joint, around a horizontal axis in the articulated joint 7a. The pivoting movement of the first mast arm 6a is effected through the first pivot drive 8a. The remaining mast arms 6b, 6c and 6d are pivotally-movably connected, around horizontal axes parallel to one another, via the articulated joints 7b, 7c, 7d, with the respectively adjacent mast arms. The pivot movement is effected through one of the pivot drives 8b, 8c, 8d in these pivot joints 7b, 7c, 7d. The pivot drives respectively comprises one (or multiple) hydraulic cylinder(s), which are advantageously actuated via proportionally functioning control valves. These, as well as the control valve for the hydraulic motor of the rotary drive 8 are, in turn, controlled by an electronic control unit 9 (FIG. 3), for the mast movement. In the exemplary embodiment, the chassis 4 of the large manipulator 1 comprises four extendable supports 14a, 14b, 14c, 14d for bracing on the ground. In the representation according to FIG. 1, it is easy to recognize that all supports 14a, 14b, 14c, 14d, are completely extended/folded down, so that the articulated mast 5, in this bracing configuration, can be rotated around the vertical axis in every direction, without the large manipulator 1 losing its stability. In this way, the mast tip 10 can assume any target position B reachable with the articulated mast 5.

The large manipulator 1 preferably comprises a mast sensor system, for example in the form of angle sensors for the joints and the rotation of the mast pedestal 3, path sensors for detecting the piston positions of the individual hydraulic cylinders or geodetic inclination sensors. With the help of the mast sensor system, for example the rotary angle $\varphi_{DW}$, the rotation of the mast pedestal 3, the pivot angles $\varphi_1$, $\varphi_2$, $\varphi_3$ and $\varphi_4$ of the articulated joints 7a, 7b, 7c, 7d are detected, wherein the control unit 9, preferably through corresponding actuation of the valves of the hydraulic cylinders and of the hydraulic motor of the rotary drive 2, controls the speed of the mast movement, depending upon the rotary angle $\varphi_{DW}$ and the current pivot angles $\varphi_1$, $\varphi_2$, $\varphi_3$ and $\varphi_4$ of the articulated joints 7a, 7b, 7c, 7d.

In the following, an exemplary embodiment of an algorithm, in this example an iterative method for temporal optimization of the mast control according the invention, is explained in detail, using a large manipulator 1. The large manipulator 1 comprises an articulated mast 5 with any number of N joints, which mast, with the mast pedestal 3, is anchored to a fixed point on the chassis 4.

FIG. 1 representatively shows the case of a truck-mounted concrete pump 1 with an articulated mast 5 comprising N=4 joints. The elastic deformation of the individual mast arms 6a, 6b, 6c, 6d is neglected so that these are considered as rigid bodies. The algorithm can, upon demand, be correspondingly expanded, in order to also take elastic mast arms 6a, 6b, 6c, 6d into account.

For identifying a control sequence for the actuation of the drives 2, 8a, 8b, 8c, 8d from an initial position A (e.g. shown in FIG. 2) of the articulated mast 5, autonomously, into a pre-specified target position B (see e.g. FIG. 3) of the articulated mast 5, the description of the kinematics of the system is required. The determining of the control sequence, temporally optimized in this example, represents a dynamic optimization problem, which generally can only be solved numerically with an iterative method. A suitable mathematical model of the dynamic behavior of the system together with its constraints must be used for the mathematical formulation of this optimization problem. Based on the simplification of the system as a rigid body problem, the joint and rotary unit angle speeds of the articulated mast 5 can be taken as input variables of the system:

$$\dot\varphi=u,$$

$$\varphi(t=0)=\varphi_0.$$

Here, the vector $\varphi=[\varphi_{DW}, \varphi_1, \ldots \varphi_N]^T$ designates the degrees of freedom of the system, which are specified through the angles of the articulated joints 7a, 7b, 7c, 7d and the rotary angle of the mast pedestal 3 around the vertical axis, $u=[u_{DW}, u_1, \ldots, u_N]^T$ designates the input vector of the desired angle speeds and $\varphi_0$ designates the angle of the system in the initial position A (e.g. transport position according to FIG. 2) or eventually an arbitrary position of the mast at the starting time point $t=t_0$. It is to be noted that, in general, the hydraulic system is configured to pre-specify the speeds of the hydraulic cylinders. With knowledge of the kinematic correlation between joint angle and piston position of the concerned cylinder, joint angle speeds can, however, always be converted into corresponding piston speeds for the cylinder. The mast should be transferred, in minimal time $t_c^*$ into the target position B, that is $\varphi_d$, which position is specified through the operator in the form of cylinder coordinates $x_{EP,N}^d$ of the last mast arm 6d. Since the kinematic correlation $x_{EP,N}=f_{EP,N}(\varphi)$ between the coordinates of the end points of the mast arms 6a, 6b, 6c, 6d and the degrees of freedom of the system, through the redundancy thereof (more degrees of freedom than spatial coordinates) is not clear, an additional criterion must be introduced, how $\varphi_d$ should be set as target position B. This can, for example, be the call for the formation of an as uniform as possible arc through the articulated mast 5, which can be achieved through an as same as possible pivot angle for the articulated joints 7b, 7c, 7d and, as the case may be, 7a.

The dynamic optimization problem can thusly, in its most minimal form, be represented through $$\min_{u(t)} \int_{t_0}^{t_e} 1 dt = t_e - t_0$$

$$u.B.v. \quad \dot{\varphi} = u,$$

$$\varphi(t_0) = \varphi_0,$$

$$\varphi(t_e) = \varphi_d,$$

wherein the end time to be minimized is designated with The optimal solution of the problem is thusly that optimal control sequence for the actuation u*(t) of the drives 2, 8a, 8b, 8c, 8d, which transfers the system, in minimum end time $t_e^*$, into the desired end state $\varphi_d$.

Moreover, the system is subject to various constraints, which must be taken into account through the optimization problem, and can be formulated in the form of inequations, as follows:

For one, constraints of the joint positions exist. The articulated joints 7a, 7b, 7c, 7d of the articulated mast 5 and also the rotary mechanism of the mast pedestal 3 generally have a limited pivot range, so that the pivot angles $\varphi_i$ for i=1, . . . , N, must satisfy the inequation $$\varphi_{i,min} \leq \varphi_i \leq \varphi_{i,max}$$

and the rotary mechanism angle $\varphi_{DW}$ must satisfy the inequation $$\varphi_{DW,min} \leq \varphi_{DW} \leq \varphi_{DW,max}.$$

On the other hand, the maximum achievable pivot speeds of the individual articulated joints 7a, 7b, 7c, 7d and of the rotary mechanism with the mast pedestal 3, effected through the drives 2, 8a, 8b, 8c, 8d, limit the system. The pivot speeds with which the individual mast functions, that is the articulated joints 7a, 7b, 7c, 7d and the rotary mechanism, with the mast pedestal 3, can be moved, are, in general, limited upwardly and downwardly in the form $$u_{i,min} \leq u_i \leq u_{i,max}$$

for i=1, . . . , N and $$u_{DW,min} \leq u_{DW} \leq u_{DW,max}.$$

These constraints are caused primarily through the hydraulic components for actuating the pivot drive 8a, 8b, 8c, 8d assigned to the respective articulated joint 7a, 7b, 7c, 7d or the rotary drive 2 for the rotary mechanism, since these must be designed for certain maximum volumetric flow rates.

A further constraint is the maximum permitted speed of the end points of the mast arms 6a, 6b, 6c, 6d or the mast tip 10 with respect to legal norms. The displacement speed in large manipulators is normally limited, since a too-quick movement of the articulated mast 5 constitutes an endangerment to persons located in the surrounding area. To ensure the operational safety, legal norms exist to that end, which define the permitted maximum speed of the tip of the articulated mast. The limitation of the movement speed of the articulated mast 5 or of the end points of the individual mast arms 6a, 6b, 6c, 6d, required by the norms, can be stated based on the kinematic description of the articulated mast 5 in the form $$\dot{x}_{EP,i} = J_{EP,i}(\varphi)\dot{\varphi} \leq \dot{x}_{EP,max}$$

$$J_{EP,i}(\varphi) = \frac{\partial f_{EP,i}(\varphi)}{\partial(\varphi)}.$$

In addition, a limitation of the maximum permitted kinetic energy of the system is useful for preventing too high loads of the mechanical construction.

$$E_{kin} = \sqrt{\frac{1}{2}\dot{\varphi}^T M(\varphi)\dot{\varphi}} \leq E_{kin,max}$$

Here, M($\varphi$) designates the generalized mass matrix of the system. This limitation is required due to the design of the maximum speeds, increased relative to a conventional mast control, of the individual mast functions, that is of the articulated joints 7a, 7b, 7c, 7d and of the rotary mechanism with the mast pedestal 3, since substantially higher speeds of the articulated mast 5 can arise thereby, which speeds, in abrupt movement stops, could lead to substantially higher forces.

In addition, the limited conveying performance of the mast hydraulic pump, with which the preferably hydraulically driven drives 2, 8a, 8b, 8c, 8d are supplied with hydraulic fluid, should be taken into account. The sum of the volume flows $q_{zu,i}$, flowing from the mast pump to the individual consumers, of the hydraulic cylinder for i=1, . . . , N as well as $q_{zu,DW}$ for the hydraulic motor of the rotary drive 2, is limited through the design of the mast pump.

$$q_{zu,DW} + \sum_{i=1}^{N} q_{zu,i} \leq q_{max}$$

$$q_{zu,i} = f_{q,i}(\varphi_i, \dot{\varphi}_i)$$

The maximum value $q_{max}$ here results from the conveyance amount of the mast pump supplying the mast hydraulics. Preferably, the conveyance amount, and thusly the maximum value $q_{max}$, can be increased through connecting for example of an accumulator charge pump typically present in concrete pumps. Usually, the accumulator charge pump supplies a hydraulic reservoir for a switching of a concrete switching valve of a two-cylinder piston pump. In order to achieve a higher conveying amount of the pump supplying the mast hydraulics and thusly a higher speed in the mast movement, in particular in the folding out of the mast, a connecting of the accumulator charge pump is useful. It is to be taken into account that the conveying amount is dependent upon the rotational speed of the internal combustion engine in the large manipulator 1. The functions $f_{q,i}(\varphi_i, \dot{\varphi}_i)$ result from the generally non-linear correlations between the piston positions $s_{z,i}$ of the individual cylinders of the pivot drives 8a, 8b, 8c, 8d and the pivot angles $\varphi_1, \varphi_2, \varphi_3, \varphi_4$, $s_{z,i} = f_{z,i}(\varphi_i)$ or the correlation of the speeds $$\dot{s}_{z,i} = \frac{\partial f_{z,i}(\varphi_i)}{\partial \varphi_i} \dot{\varphi}_i.$$

resulting therefrom.

Depending on the direction of movement of the articulated joints 7a, 7b, 7c, 7d, the concerned volume flow $q_{zu,i}$ can be computed from the product of the piston speed and the respective effective surface $A_{z,i}$ of the cylinder (piston or rod side, depending upon direction of movement), $q_{zu,i} = |\dot{s}_{z,i}| A_{z,i}$ (signum($\dot{s}_{z,i}$)).

In the rotary drive 2, a linear correlation between the volume flow and the rotary angle speed arises at the rotatable mast pedestal 3, depending upon the transmission of the gear mechanism and the displacement of the hydraulic motor.

To avoid collisions of the articulated mast 5 with the vehicle (consisting of the operator's cab 15 and the chassis 4), the supports 14a, 14b, 14c, 14d, and the ground, the working space of the articulated mast 5 must be limited. While the limiting, due to the ground, can be easily represented based on the kinematics, the vehicle (consisting of the operator's cab 15 and the chassis 4) and the supports 14a, 14b, 14c, 14d must be taken into account as simplified 3D objects. Here, it is to be noted that the articulated mast 5 must be extended out of the transport position (shown in FIG. 2), in which position the folded mast rests upon the chassis 4 of the vehicle. In addition, the avoiding of collisions with further 3D objects, such as houses, trees or power lines, can be taken into account. These further objects can be detected through a suitable sensor system, such as for example by means of a laser, ultrasonic, or radar scanning of the construction site. Alternatively, thereto, a camera system could also be employed for identifying the position and geometry of possible collision objects. To measure the generally large working space of the truck-mounted concrete pump, the sensor system can, for example, be attached onto one or multiple autonomous volant drones.

For the mathematical description of the collision conditions, the mast arms 6a, 6b, 6c, 6d, the supports 14a, 14b, 14c, 14d and the vehicle (consisting of the operator's cab 15 and the chassis 4) are described, in a simplified manner, as geometric encasing cuboids, in which the individual bodies can, in entirety, be encased. The dimensions of the encasing cuboids should here be selected as small as possible, so that not-too-restrictive collision conditions result therefrom.

Preferably two encasing cuboids are selected for the vehicle, wherein one of them includes the operator's cab 15 and a further one includes the rear part of the vehicle, that is the chassis 4. For the avoidance of collisions, the keeping of a minimum distance between the encasing cuboids of the mast arms 6a, 6b, 6c, 6d and the encasing bodies of the supports 14a, 14b, 14c, 14d, as well as of the vehicle (consisting of the operator's cab 15 and the chassis 4) is implemented in the form of an auxiliary condition of the optimization problem. Different approaches are known, in the literature, from the field of robotics and 3D simulation, for the special formulation of this auxiliary condition, To achieve the object posited herein, so-called distance functions are preferably used for the calculation of the distances. The distance function preferably used here belongs to the class of Linn-Canny algorithms. It represents the encasing body with different hierarchies of details in a tree structure and can thus efficiently narrow down the nearest points of two encasing bodies. The two nearest points on the encasing bodies are temporally tracked with the help of so-called Voronoi regions, with which the distance calculation after a movement of the encasing bodies in the vicinity of the ancient position of the points can be repeated. Along with the freedom from collision of the individual bodies amongst one another, the freedom from collision of the individual mast arms 6a, 6b, 6c, 6d with the ground must be made certain of in addition. This can occur in simple form thereby in that the heights $h_{EP,i}$ for $i=1, \ldots, N$ of the end points of the mast arms 6a, 6b, 6c, 6d, which respectively represent an entry of the coordinates $x_{EP,i}$, may not fall below a minimum value $h_{min}$, $h_{EP,i} \geq h_{min}$. If the value for $h_{min}$, here is selected correspondingly large, the maintaining of the inequation condition ensures the freedom from collision with the ground of the entire articulated mast 5.

Figure 2:
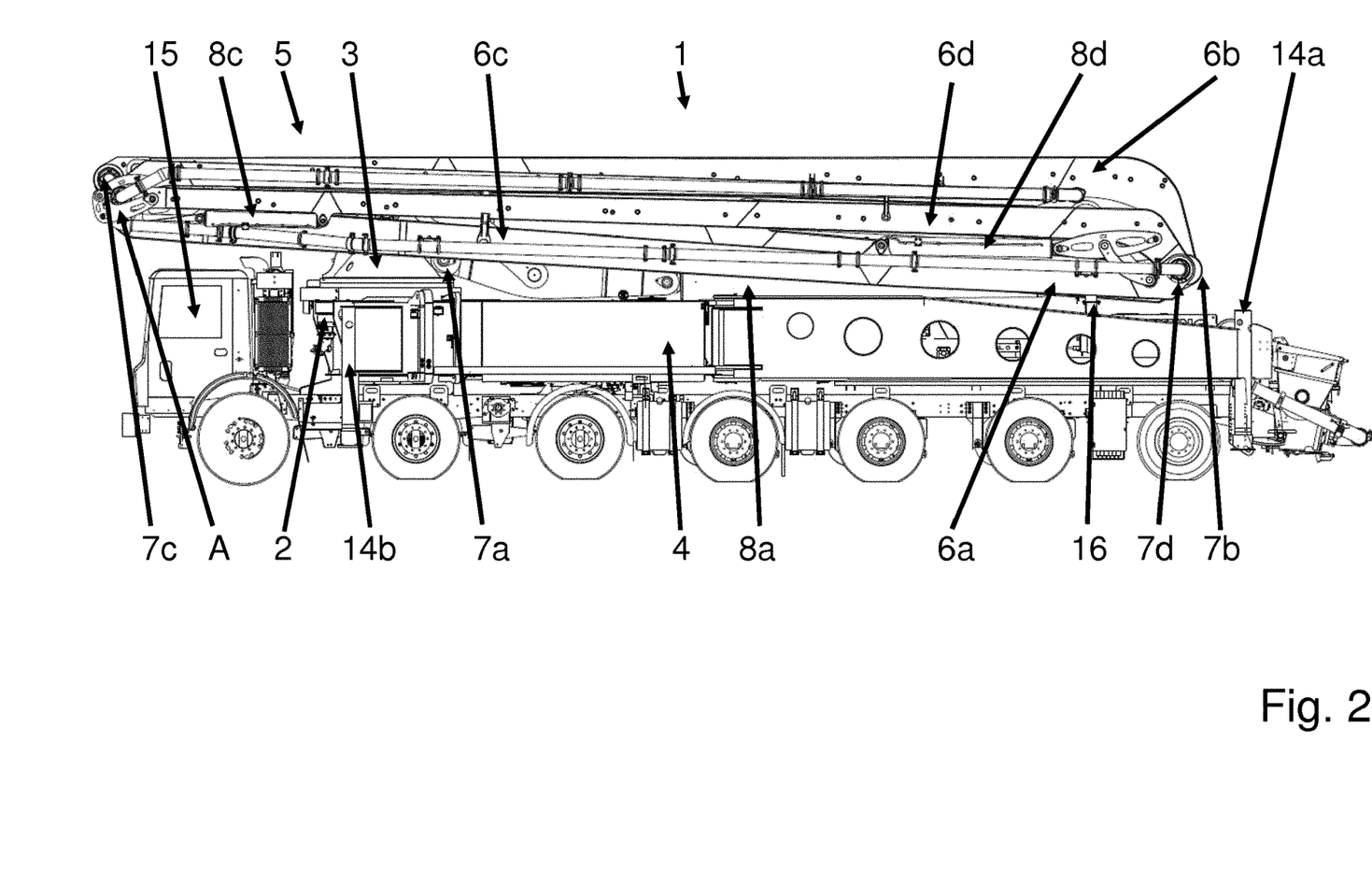
FIG. 2: a large manipulator according to the invention with articulated mast in folded position.

Moreover, the contact, permitted during normal operation, of the folded articulated mast 5 in the mast support 16, shown in FIG. 2, must be mapped. If the articulated mast 5 is located in the mast support 16, this mast may be lifted, but may be rotated only after a certain pivot angle for the articulated joint 7a, This is described in the form of a constraint $b_{DW}(\varphi_1)$ of the actuating variable for the rotary mechanism, here designated with $u_{DW}$, dependent on the pivot angle of the articulated joint 7a, here named $(\varphi_1, -b_{DW}(\varphi_1) \leq u_{DW} \leq b_{DW}(\varphi_1)$.

Figure 3:
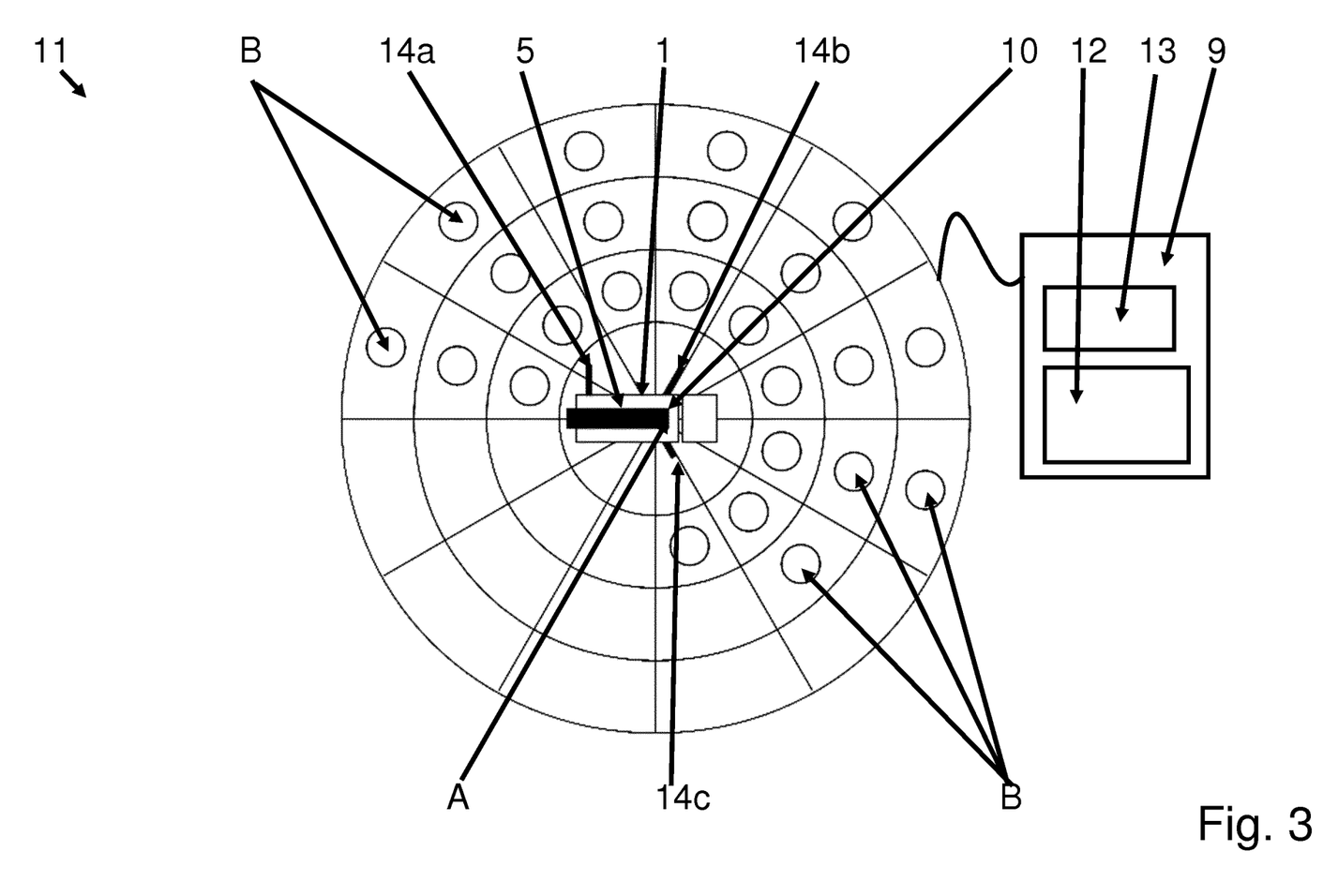
FIG. 3: Graphical representation for controlling the articulated mast of a large manipulator.

Furthermore, the stability of the large manipulator 1 should be provided in a partial bracing, shown in FIG. 3, as well. In the so-called partial bracing, the supports 14a, 14b, 14c, 14d are only partially, and not necessarily completely extended/folded down. In the example for a partial bracing indicated in FIG. 3, the supports 14a, 14b are completely extended/folded down, the support 14c only partially and the support 14d not or hardly extended/folded down. Such a partial bracing can be required if the circumstances, on the construction site, permit no other set-up possibilities of the large manipulator 1, since, on the side of the not, or only partially extended/folded down supports, no space is made available/e.g. on a street). If the large manipulator 1 is only partially braced, the algorithm, for calculating the extension process, must take this into account so that, in the control sequence, only mast positions are travelled, which are stable in a partial bracing as well. The extension/fold-down position of the supports 14a, 14b, 14c, 14d is preferably metrologically detected via a suitable sensor system. The position of the supports 14a, 14b, 14c, 14d can be taken into account for the actuation of the drives 2, 8a, 8b, 8c, 8d in that, in a known mass distribution, the center of gravity $c^A(\varphi)$ of the articulated mast 5 is computed depending upon the pivot angles $\varphi_1, \varphi_2, \varphi_3, \varphi_4$ arising in the unfolding process, in the articulated joints 7a, 7b, 7c, 7d, in order to asses, with this center of gravity, and center of gravity of the vehicle $c_p$ to be assumed as known and constant, as well as the centers of gravity $c_{St,i}(s_{St,q})$ for $i=1, \ldots, 4$ of the four supports 14a, 14b, 14c, 14d, if the center of gravity of the entire large manipulator 1 is located within the tilt quadrilateral, which is formed through the endpoints of the supports 14a, 14b, 14c, 14d of the chassis 4. The centers of gravity of the individual support 14a, 14b, 14c, 14d are here dependent on the extension state $\delta_{Sf,i}$ thereof. To provide the stability of the large manipulator 1 must now apply that the horizontal distance $\tau_{c,Kk}$ to the nearest tilting edge of the tilting quadrilateral always has a positive minimum dimension $\tau_{c,min} > 0$, i.e. $r_{c,Kk} \geq r_{c,min}$. It is to be noted here that the distance of a center of gravity outside of the tipping quadrilateral is to be assessed negatively.

To compute a time-optimized control sequence for the actuation of the drives 2, 8a, 8b, 8c, and 8d, a suitable performance function must be minimized, which function contains the total time of the folding process in the transferring of the articulated mast 5 out of an initial position A into a target position B or a variable directly derived therefrom as a optimization variable. The performance function must here be minimized while taking into account the above-described equation and inequation conditions, which conditions represent the constraints of the system. With regards to the implementation of the algorithm, as well as the formulation of the performance function, different variants are known in the general literature on the subject of dynamic optimization and are applicable for achieving the object. A special approach that can preferably be used for achieving the present object is the so-called TEB (Timed Elastic Band) approach. In this approach, the control sequence to be found for the actuation of the drives 2, 8a, 8b, 8c, 8d and the trajectory of the articulated mast 5 are temporally discretized with a fixed number n of scanning points, for the reformulating of the optimal control problem into a numerical optimization problem. The temporal difference $\Delta t$ between two scanning points, as well as the states $x_k$ (and manipulating variables $u_k$) discretized over the total time are defined as optimization variables. These variables are summarized in the set $\beta$. The numerical optimization problem is thus defined as follows:

$$V^*(\beta) = \min_{\beta} \Delta t \text{ with } \beta := \{x_1, u_1, \ldots, x_{n-1}, u_{n-1}, x_n, \Delta t\}$$

$$u.B.v. \ x_1 = x_s, x_n = x_f, \Delta t > 0$$

$$h_k(x_{k+1}, x_k, u_k, \Delta t) = 0$$

$$g_k(x_k, x_{k+1}, u_k, \Delta t) \geq 0$$

The starting state with the initial position A is therein designated with $x_s$, and the desired final state with the target position B is designated with $x_f$. To achieve temporal optimality, the total time $T_f = (n-1)\Delta t$, or equivalently thereto the temporal difference $\Delta t$ (as n−1 is constant), is minimized. The equality auxiliary conditions are summarized under $h_k$, and the inequality auxiliary conditions are summarized under $g_k$, respectively at the point in time k. To solve this optimization problem, so-called "Sequential Quadratic Programming Solver", as well as "Interior Point Solver" are usually used. Preferably, an "Interior Point Solver" finds use, which includes the auxiliary conditions $g_k$ and $h_k$, via so-called barrier functions, into the measure of quality.

The launching of the control sequence, established through the solving of the dynamic optimization problem, for the actuation of the drives 2, 8a, 8b, 8c, 8d on the actual system of the large manipulator 1 would, in the ideal machine behavior assumed in the model, lead to the transferring of the articulated mast 5 into the desired state, that is the target position B, with exactly the trajectory computed in the optimization. In an actual large manipulator 1, deviations inevitably occur, however, since the angle speeds pre-specified via $u_i$, in the articulated joints 7a, 7b, 7c, 7d, cannot be exactly implemented through the pivot drives 8a, 8b, 8c, 8d, and the pre-specified rotational speed for the rotary mechanism cannot be exactly implemented through the rotary drive 2. Since the dynamics of the system behaves approximately like an open integrator for each mast function, that is for the articulated joints 7a, 7b, 7c, 7d and for the rotary mechanism, with the mast pedestal 3, the system would, without a regulating intervention, inevitably drift away from the target trajectory. For this reason, it is useful to monitor the maintaining of the trajectory of the articulated mast 5, and to engage, in an actively regulating manner, in case of too-great deviations from the target trajectory.

A simple variant for such an intervention is the implementation of a position regulator for each individual mast function. The target values for the regulator are here generated from the target trajectory. The regulators, in this case, ensure, as far as possible, the adherence to the movement path, that is the trajectory without the temporal assignment, not necessarily, however, the adherence to the temporal specifications. This can, for example, be problematic, if required speeds cannot be implemented, due to flow forces acting upon the control valves, through the drives 2, 8a, 8b, 8c, 8d. A regulator could only conditionally temporally compensate such deviations. The planned remaining trajectory, on the basis of the actual state already deviating from the target trajectory, could correspondingly no longer be temporally optimal. In the worst case, the regulator would, in a too-great deviation, no longer ensure the freedom from collision to be maintained, to that the transferring of the articulated mast 5 from the initial position A into the target position B would have to be interrupted automatically or manually.

An embodiment, improved relative to the simple position regulator, for providing the adherence to the trajectory, the temporal optimization and the constraints is the use of a so-called Model Predictive Control regulator. In this regulator, the actual state of the system is detected in fixed time intervals, and the dynamic optimization problem, with the behavior predicted by the system model on the basis of this actual state, is again achieved, thusly as a new initial position. The new solution is activated as control sequence for the actuation of the drives 2, 8a, 8b, 8c, 8d, or as target trajectory of the articulated mast 5, by the control unit 9. The remaining trajectory is thus optimized, and the adherence to critical constraints, for example the indispensable freedom from collision, can be substantially better ensured.

The use of a temporally optimized control sequence for the actuation of the drives 2, 8a, 8b, 8c, 8d in the unfolding of the articulated mast 5, in the set-up process of the large manipulator 1 on a construction site, is particularly suitable. FIG. 2 shows the large manipulator 1 in ready-for-drive configuration. The supports 14a, 14b, 14c, 14d of a chassis 4 are retracted and the articulated mast 5 rests in the mast support 16. Arriving at the construction site, the operator must horizontal extend the supports 14a, 14b, 14c, 14d and lay out the support plates. Subsequently, the supports 14a, 14b, 14c, 14d are vertically extended/folded down and the chassis 4 is levelled. Following this, the still completely folded articulated mast 5 must be unfolded. Here, the operator supports the control unit 9 embodied according to the invention and hereby reduces the set-up time which is required, in order to bring the large manipulator 1 into the configuration, represented exemplarily in FIG. 1.

A mast control according to the invention is disclosed with the above-presented exemplary embodiment, in which control the control unit 9 is configured to autonomously transfer the articulated mast 5, with a temporally optimized control sequence for the actuation of the drives 2, 8a, 8b, 8c, 8d, from an initial position A of the articulated mast 5 into a pre-specified target position B of the articulate mast 5. In this exemplary embodiment, the temporal optimization aims at a minimization of the travel time of the articulated mast 5 from the initial position A to the target position B. It is to be noted that, in the presented algorithm, the absolute minimum traveling time is not necessarily meant by "temporally-optimized", since such a manner of algorithm would possibly need a great deal of computing time. Meant instead is an as minimal as possible driving time, which is still feasibly to be computed taking into account e.g. the available computing capacity of a computer or the control unit 9 on the large manipulator 1. To increase the computing efficiency, it would e.g. be conceivable to store certain processes, in the set-up or unfolding of the articulated mast 5, in the storage 12 fixedly as a uniform process, which processes, in all scenarios, have approximately the same flow. This could be about the first 10 to 30 seconds in the traveling from the mast support 16, which seconds are particularly critical with respect to possible self-collisions with the chassis 4 and the supports 14a, 14b, 14c, 14d, which can be computationally expensive in an online computation. Such a subdivision of the entire unfolding process would, however, lead to the loss of the absolute minimum travel time. It would be a suboptimal solution, which would only slightly be slower. The basic idea of the invention, however, would remain preserved nevertheless. Alternatively to the requiring of the temporal optimality, e.g. a maximum time, considered to be realistic, for the travel process (e.g. one minute) could also be fixedly pre-specified in the algorithm, which must be adhered to by the control sequence to be computed. Here, the algorithm would be broken off as soon as a solution of the dynamic optimization problem is found, which adheres to this specification. In such a case as well, the absolute temporal optimality is no longer given, although the total time for the mast set-up can be massively reduced, through the computed control sequence, in comparison to a typical manual operation, which reduction is achieved through the autonomous transferring according to the invention into the target position B.

In a further design variant, it would be conceivable, in the description of the control sequence, to achieve an as great as possible distance to obstacles, and to incorporate these distances as variables to be optimized in the power function. The two contradictory requirements of temporal optimality and maximum distance must be differently weighted. The solving of the optimal control problem then represents a compromise between these two requirements, which solution, depending upon weighting, has a different outcome. The total time, in this case, would no longer be absolutely minimal, but the control sequence would still be optimized with regards to the time.

FIG. 3 exemplarily shows a graphical illustration 11, with the help of which the operator can identify the target position B of the articulated mast 5, through selection of buttons, on the graphical representation 11. The graphical representation 11 shows the large manipulator 1 from a bird's eye view. As can be discerned in FIG. 3, the graphical representation 11 indicates that, via the supports 14a, 14b, 14c and 14d of the chassis 4, a partial bracing is provided. In this bracing configuration, merely the supports 14a, 14b and 14c are horizontally extended/folded-in. The not extended/folded-in support 14d is not represented here, but braces the chassis 4 vertically on the ground, nonetheless. On the basis of this bracing configuration, only certain target positions B are selectable, which is indicated through the points in the approached sectors. Through selection of one of the possible target positions B, the target position B is pre-specified to the control unit 9, in which position the articulated mast 5 is meant to be autonomously transferred from the current position or the initial position A (which is metrologically detect by the mast sensor system), e.g. articulated mast 5 folded, with a temporally optimized control sequence for the actuation of the drives 2, 8a, 8b, 8c, 8d. After selection of the target position B, the desired height of the mast tip 10 from the ground can additionally be entered. As is further indicated in FIG. 3, a connection exists between the graphical representation 11 and the control unit 9 with the storage 12 and the computing unit 13, so that a selection, via the graphical representation 11, by the user, is detected and processed by the control 9. The specification of the target position for the mast tip can also occur through the user based on numerical inputting of the target coordinates.

Instead of the use of the above-described optimization algorithm for each travel process, it is also conceivable to simply manually establish, or to compute offline, for example with the presented algorithm, as favorable as possible control sequences for different standard initial positions A (e.g. articulated mast 5 in support 16) and standard target positions B, for example shown in FIG. 3, and to retrievably store these control sequences in a data storage 12, so that it is not necessary to carry out a possibly protracted computing process before or during the extension process of the articulated mast 5 for standard scenarios.

Alternatively, the user could specify the target position through the positioning of a remote control unit or another radio device at the target position, in that the target position is established, relative to the large manipulator 1, by means of a suitable measuring system, e.g. radio-triangulation measurement or satellite-supported positioning system (GPS, Galileo).

LIST OF REFERENCE CHARACTERS

1 large manipulator I truck-mounted concrete pump
2 rotary drive
3 mast pedestal
4 chassis
5 articulated mast
6a, 6b, 6c, 6d first to fourth mast arm
7a, 7b, 7c, 7d first to fourth articulated joint
8a, 8b, 8c, 8d first to fourth pivot drive
9 control unit
10 mast tip
11 graphical representation
12 storage
13 computing unit
14a, 14b, 14c, 14d supports
15 operator's cab
16 mast support
A initial position
B target position
θ rotary angle
$\varphi_1, \varphi_2, \varphi_3, \varphi_4$ pivot angle of the mast joints

The invention claimed is:

1. A large manipulator comprising:
a chassis;
a mast pedestal rotatable around a vertical axis by means of a rotary drive and arranged on the chassis;
an articulated mast including two or more mast arms pivotally-movably connected, via articulated joints, with the respectively adjacent mast pedestal or other mast arm by a pivot drive; and
a control unit configured to actuate the pivot drive and/or the rotary drive to move the articulated mast, autonomously and time-optimized, with a control sequence from an initial position of the articulated mast into a pre-specified target position of the articulated mast,
wherein the control unit is configured to calculate the control sequence by numerically solving a dynamic optimization problem with constraints by minimizing a quality function, which contains (1) a total time of a folding operation when transferring the articulated mast from the initial position to the pre-specified target position or (2) a variable derived directly therefrom as an optimization variable.

2. The large manipulator of claim 1, wherein the articulated mast comprises a mast tip, wherein the pre-specified target position of the articulated mast is defined through a pre-specified position of the mast tip.

3. The large manipulator of claim 1, wherein specifying the pre-specified target position of the articulated mast occurs through selection in a graphical representation, wherein the graphical representation offers a selection of possible target positions of the articulated mast.

4. The large manipulator of claim 1, wherein the control unit is configured to establish the control sequence such that the total time is minimized.

5. The large manipulator of claim 1, wherein the control unit is configured to establish the control sequence such that the total time does not exceed a pre-defined maximum time.

6. The large manipulator of claim 1, further comprising:
a mast sensor system configured to detect a position of at least one point of the articulated mast or a pivot angle of the at least one articulated joint, wherein the control unit is configured to establish the position of the articulated mast based on an output signal of the mast sensor system.

7. The large manipulator of claim 6, wherein the control unit is configured to establish the initial position of the articulated mast based, at least in part, on the output signal of the mast sensor system.

8. The large manipulator of claim 6, wherein the control unit is configured to establish the control sequence for the autonomous moving of the articulated mast into the pre-specified target position of the articulated mast based, at least in part, on the output signal of the mast sensor system.

9. The large manipulator of claim 1, wherein the control unit comprises data storage including the control sequence.

10. The large manipulator of claim 1, wherein the constraints include one or more of: a pivot range of the individual articulated joints, maximum achievable pivoting speeds of the individual articulated joints, maximum allowed speed of a mast tip, maximum permitted kinetic energy of the articulated mast, conveying quantity of a hydraulic pump supplying the hydraulic drives, avoidance of collisions, a bracing configuration of the large manipulator.

11. A method for controlling movement of an articulated mast of a large manipulator, the large manipulator including a chassis, a mast pedestal arranged on the chassis and rotatable around a vertical axis by means of a rotary drive, the articulated mast including two or more mast arms pivotally and moveably connected via articulated joints with the respectively adjacent mast pedestal or mast arm by a pivot drive, and a control unit for actuating the pivot drive, the method comprising:
autonomously actuating the rotary drive and/or the pivot drive via a control sequence that is time-optimized and calculated by the control unit such that the articulated mast is moved, with the control sequence, from an initial position of the articulated mast to a pre-specified target position of the articulated mast, wherein the control unit calculates the control sequence by numerically solving a dynamic optimization problem with constraints by minimizing a quality function, which contains (1) a total time of a folding operation when transferring the articulated mast from the initial position to the pre-specified target position or (2) a variable derived directly therefrom as an optimization variable.

12. The method of claim 11, wherein the control unit selects the control sequence for the actuating of the drives, for which the total time is minimized minimal.

13. The method of claim 11, wherein the control sequence is based on an output signal of a mast sensor system, which detects a position of at least one point of the articulated mast or of a pivot angle of at least one of the articulated joints.

14. The method of claim 11, wherein the constraints include one or more of: a pivot range of the individual articulated joints, maximum achievable pivoting speeds of the individual articulated joints, maximum allowed speed of a mast tip, maximum permitted kinetic energy of the articulated mast, conveying quantity of a hydraulic pump supplying the hydraulic drives, avoidance of collisions, a bracing configuration of the large manipulator.

* * * * *

UNITED STATES PATENT AND TRADEMARK OFFICE
CERTIFICATE OF CORRECTION

PATENT NO. : 11,655,642 B2
APPLICATION NO. : 16/472612
DATED : May 23, 2023
INVENTOR(S) : Torsten Bertram et al.

It is certified that error appears in the above-identified patent and that said Letters Patent is hereby corrected as shown below:

In the Claims

Claim 12 - Column 16, Line 29:
Delete the word "minimal"

Signed and Sealed this
Eighteenth Day of July, 2023

Katherine Kelly Vidal
*Director of the United States Patent and Trademark Office*